Fig. 2

Sept. 4, 1928.  F. PHILY  1,683,052
LOOM FOR MANUFACTURING NONRAVELING FABRICS
Filed Dec. 31, 1926  6 Sheets-Sheet 3

Fernand Phily
INVENTOR
By [signature]
his Attorney.

Sept. 4, 1928.  
F. PHILY  
1,683,052

LOOM FOR MANUFACTURING NONRAVELING FABRICS

Filed Dec. 31, 1926  
6 Sheets-Sheet 4

Fernand Phily  
INVENTOR  
By *(signature)*  
his Attorney.

Patented Sept. 4, 1928.

1,683,052

UNITED STATES PATENT OFFICE.

FERNAND PHILY, OF PAU, FRANCE.

LOOM FOR MANUFACTURING NONRAVELING FABRICS.

Original application filed November 10, 1925, Serial No. 68,080, and in France November 20, 1924. Divided and this application filed December 31, 1926. Serial No. 158,201.

My invention relates to a machine for producing a novel kind of non-raveling fabric usable for the manufacture of sundry articles such as garments, underwear, fancy goods, hosiery, trimmings, tulles and the like. For the sake of brevity the machine will be referred to as a loom, although it is not a loom in the strict sense of that term as used in the weaving art.

The present application is a division of my co-pending patent application filed November 10, 1925, Serial Number 68,080.

Stated in general terms the loom comprises stationary yarn guides for the warp threads and an oscillatory tension bar to cause each warp thread to form a loop through which a weft or filler thread can be passed, the warp and filler threads being looped together. Suitably formed reeds are employed to push or force the loops of the warp threads and the co-operating filler threads out of the yarn guides.

In the operation of the loom neither a jacquard nor other kind of reproducing device is needed, the desired patterns in the fabrics being produced by suitable manipulation of certain parts of the mechanism and by variations of the color and the character of the warp and filler threads.

In order that the invention may be fully understood, it will now be described with reference to the accompanying drawings showing one form of the loom and a few examples of the fabrics that can be woven by the same.

Fig. 1 is a vertical section of the loom.

The loom comprises a base-plate 1 to which the frame 3 of the loom is secured by bolts 2 or other means. The front part of said frame has at each side a ball bearing 4 carrying the driving shaft 5. At one end of said shaft is mounted a pulley 6 connected by a belt with a motor (not shown). At the middle of said shaft is a hand wheel 7 and at the end opposite the pulley is a regulating flywheel 8. The shaft also carries two cams 9 of suitable outline, each in contact with a roller 10 mounted loose on the shaft 11 of a fork 12 which is secured by screwing or otherwise to a support 13. These supports 13 which are two in number, are keyed to a shaft 14 mounted in two ball bearings 15 which are secured in the rear of the bearings 4, to the front part of the frame 3. Each support 13 has at the top a ball bearing 16 carrying a shaft 17. To said shaft are keyed two arms 18 carrying at the ends a tension bar 19 preferably an angle bar. The said bar serves to stretch or to slacken the fabric and also the warp ends during the operation, and then to place the fabric in positions which will not hinder the succeeding movements of the bar 19. On each end of the shaft 17 is keyed a double armed lever 20 whose upper arm 21 is only half as long as the lower arm 22. To the short arm 21 is pivoted a link 23, and to the long arm 22 is pivoted a link 24. These two links are guided at the outer ends in the upright 25 of the frame 3 where they pass through the apertures 26 and 27 provided for this purpose in the frame. The links are provided with abutments 28, 29 whose function will be set forth in describing the operation of the loom.

Figures 1, 3:
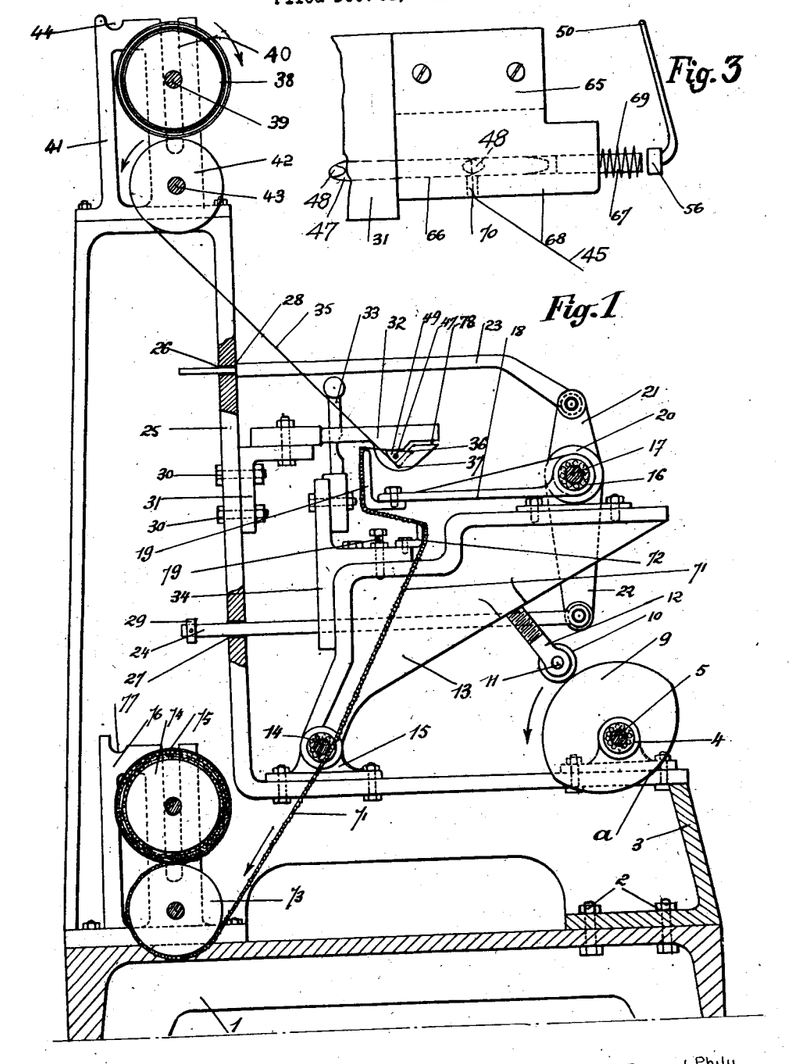

To the upright 25 is secured, by bolts 30 or otherwise, an angle iron member 31 to hold the yarn guides 32, whose number depends upon the width of the loom. The said guides, of the form shown, are juxtaposed, with a spacing such that the blades of the reeds 33 will pass freely. As can be seen from Fig. 1, said reeds, whose blades are perpendicular to the yarn guides, are mounted on a T-shaped holder 34 carried by the supports 13. It should be noted that said blades may have various shapes, i. e., they may be notched at their point of contact with the mesh as shown in Fig. 1, so as to prevent them from cutting the weft, and on the other hand to facilitate the pushing forward of the loops. But the said blades may be either straight as shown in Figs. 4 to 8 or curved or of any other suitable shape. Each yarn guide 32 carries a warp thread 35 so as to form a closed loop which has preferably an approximately triangular shape, for which purpose each yarn guide has two holes 36, 37 for the insertion of the warp thread. It should be noted that the latter can be inserted from the right or the left hand side of the guide, this depending upon the direction (right or left) in which the thread is to be twisted round the weft yarn. Instead of one warp end, two may be threaded, i. e., one from each side.

Figure 2:
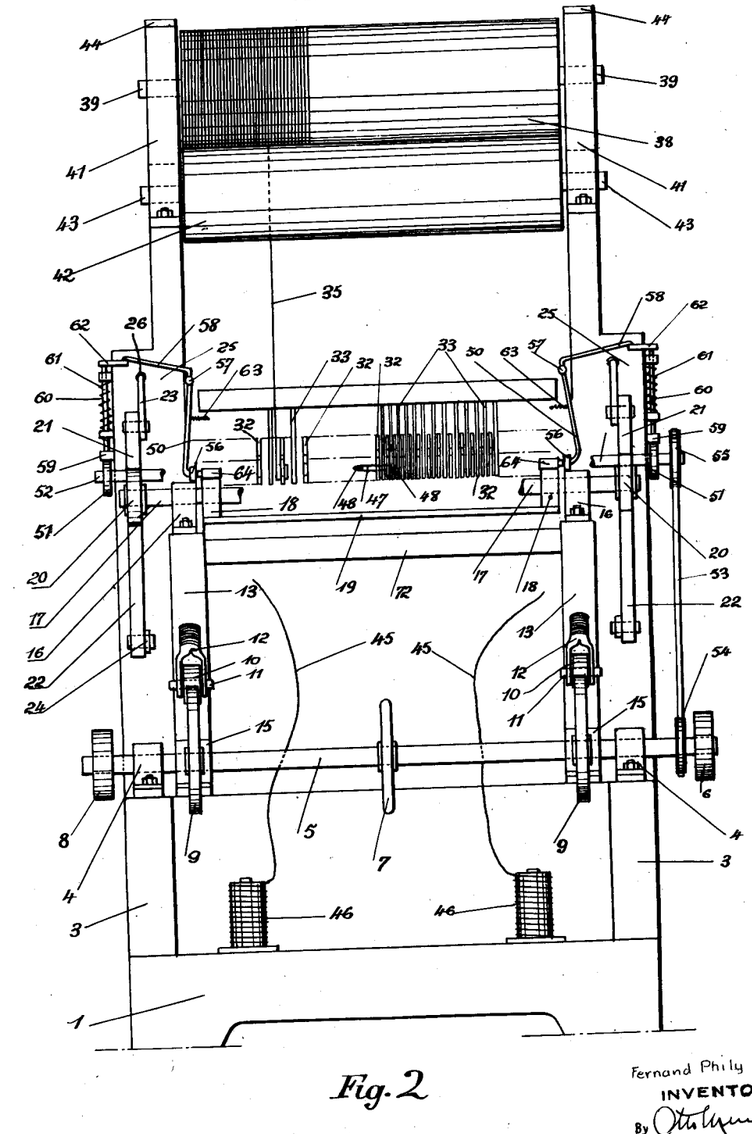
Fig. 2 is an elevation and Fig. 3 a plan of a detail.

To show more clearly the manner of threading the warp in one of the guides reference will be had to Figure 1, and there is shown at the left of Fig. 2 three guides and two reed blades which are somewhat wider and spaced further apart than those on the right of the same figure. It will be seen from Fig. 1 that the warp 35 is inserted first into the lower hole 37, passing thence to the other side of the yarn guide, and then rises and enters the upper hole 36, finally issuing thence and proceeding to the tension bar 19. Said warp 35 is wound on a beam 38 whose shaft 39 is adapted to be lowered in a guide slot 40 formed in a bracket support 41 which is secured to the upper part of the main frame 3. Owing to the said slot 40, the warp is made to unwind from the beam and the diameter of the latter can thus diminish without losing contact with the driving roller 42. The beam 38 bears freely against the driving roller which is rotatable on its shaft 43 and is actuated by any suitable means. The roller 42 rotates the beam 38 by friction, and in such a way that the warp will be unwound therefrom in the necessary amount to form a loop.

It should be noted that the roller 42 might also be actuated by the natural traction of the warp during the formation of the loop. To enable the beam 38 to be rendered inoperative, each support 41 is provided at the top with a notch 44 adapted to receive the journals of the beam.

The weft yarn of filler thread 45 necessary for forming the loops is supplied from bobbing 46 mounted on the base 1 to the right and left of the loom, or in any other suitable position. It will be evident that, according to its quality, the weft may consist of one or more threads at a time. Said weft is brought to the shuttle or bodkin 47 which takes up the weft at the right or left of the loom and then draws it through the latter, consists of a simple metal rod of suitable section, having at each end a hook 48. Said shuttle moves in recesses 49 in the yarn guides 32 and is driven at each end of the loom by a picking device 50, which is actuated by a cam 51 mounted on a shaft 52. Said shaft is driven by a belt or a chain 53 connecting a pulley or wheel 54, mounted on the main shaft 5, with a second pulley or wheel 55 keyed to the shaft 52. The picking device 50 comprises a striker 56 pivoted at 57, and a small lever 58. Each cam 51 is in contact with a bowl 59 fixed on the lower end of a vertically movable rod 60. Around said rod is coiled a spring 61 held between two abutments serving at the same time to guide the said rod which has at the top a small arm 62 in contact with the small lever 58 of the striker. On the cam 51 being actuated the rod 60 is raised, thus swinging the striker 56 to the rear by means of the arm 62 and the lever 58. When the cam 51 ceases to act upon the rod 60, the spring 61 brings the latter back to its first position, while another spring 63 acts at the same time to draw the striker 56 with some force into its first position and when at this point, the striker will strike the shuttle 47 through a pusher to be described later, so as to drive it to the other side of the loom where, after having taken up a weft thread, the shuttle is again struck by the other striker 56 which operates in the same manner as already described.

In order to avoid all possibility of the shuttle rebounding when it is struck, the striker does not act directly upon the shuttle but through a pusher which serves as a brake for the striker after the impact. To this end there is arranged at each side of the loom a shuttle box 64 (see Fig. 2) the construction of which is more clearly shown in Fig. 3. This box, in which the shuttle awaits the impact of the striker 56, consists of a plate 65 secured to the bracket 31 of the yarn guides. Said plate is strengthened in front, to enable a channel 66 to be provided therein for the reception and stroke of the shuttle 47. While the loop is being formed, the shuttle is held in said channel 66 by jamming and there is provided for that purpose a tapered part (a spring catch or the like) to grip one end of the shuttle. When the loop is formed and the reed with its blades 33 has returned to the first position, the shuttle is driven out of its channel 66 by a pusher 67 which is lodged in a projection 68 on the plate 65 and is struck directly by the striker 56. On the outer end of the pusher is mounted a spiral spring 69 which returns it into its original position after the impact. For the insertion of the weft yarn 45 which is to be presented to the hooks of the shuttle 47, the plate 65 has a second channel 70 communicating with the channel 66 in which the shuttle is lodged. The shuttle might also be struck directly by the striker, in which case a suitable brake may be substituted for the said pusher.

In proportion as the loops are completed, the fabric 71—guided by a bar 72 (Fig. 1)—will be wound, by means of an actuating roller 73 upon the cloth beam 74 which is mounted loose (as is the beam 38) in a guide slot 75 provided in a support 76 secured to the base-plate 1 of the loom. Said actuating roller may be driven by any suitable means, and the support is provided (like the other, 41) with a notch 77 wherein the beam 74 may be placed at rest.

The operation of this loom is as follows:

To explain as clearly as possible the formation of a loop, i. e., to show the method of twisting the warp around the weft yarn, various positions of the parts are shown in Figs. 4 to 8, and in order to simplify the description, only the operation of one part will be described where there are two similar parts and the second operates in a like manner.

Figure 4:
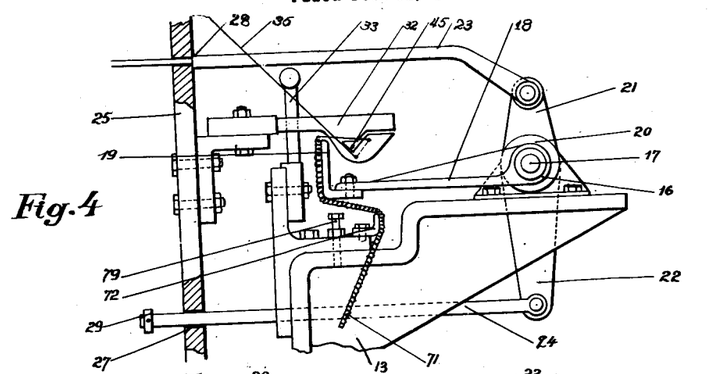
Figs. 4 to 8 show the formation of a loop, in its several stages.

The position according to Fig. 4, which corresponds to that of Fig. 1, shows the loop forming parts in the inoperative position, during which the weft yarn is taken up by a hook of the shuttle 47.

In this position, the concentric parts of the cams 9 are in contact with the rollers 10, and the abutments 28 of the links rest against the vertical part 25 of the frame 3, so as to raise the tension bar 19 and to place the warp 35 ready for the weft.

Figure 5:
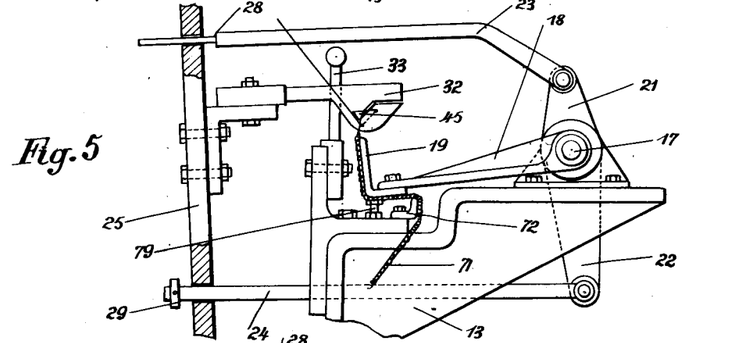
Figure 6:
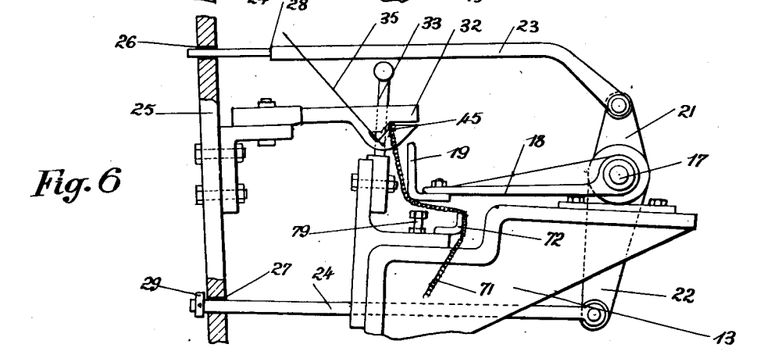

The position shown in Fig. 5 is obtained by turning the shaft 5 either through the hand wheel 7 or through the driven pulley 6 so as to bring the eccentric parts of the cams 9 into contact with the rollers 10, thus displacing the links 23 and 24 and the supports 13 with their members so that the bar 19 has guided the warp yarn 35 and the fabric 71 below the yarn guide 32, and has also effected the oscillation of that part of the fabric which is situated between the bar 19 and the bar 72. Another result of this movement is that the warp situated between the upper exit eye 36 of the yarn guide, and the fabric, has been slackened in order to facilitate the formation of the loop and the placing of the latter in the slot 78 of the said guide, as can be seen in Fig. 6. In the position shown in Fig. 5, the bar 19 drops by its own weight, but obviously it might be provided with a counterweight or a recoil spring. The down stroke is limited by a set screw 79 placed below the bar 19.

Upon further turning the shaft 5, the position shown in Fig. 6 is reached, in which, as can be seen, a loop is partly formed, and it can also be seen that the links 24 have moved so as to have the abutments 29 bear against the upright 25 of the frame 3. This movement enables the supports 13 and their parts to be tilted—by means of the double lever 20—to such an extent that on the one hand the bar 19 will be raised out of its previous position, whilst on the other hand the blade 33 of the reed has made contact with the weft 45, and pushed it, along with the warp 35, (the loop of which has now been formed), out of the yarn guide. It will also be seen that the fabric follows the bar 19 along the lower contour of the yarn guide, and that as the bar rises the fabric continues to be progressively slackened, so as to assist the finishing of the loop.

Figure 7:
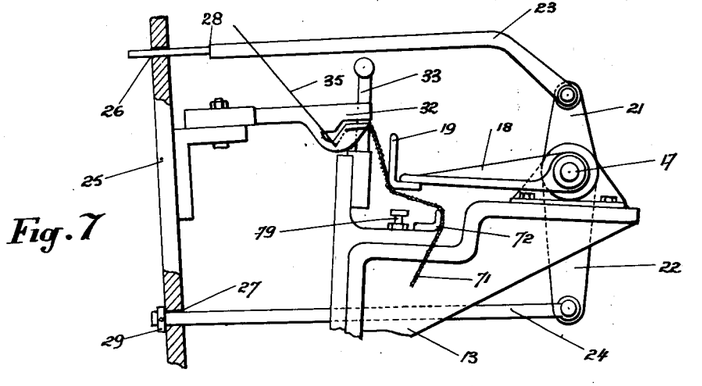

Upon continuing to turn the shaft 5 the position shown in Fig. 7 is attained, in which the tension bar has risen to about the level of the point of exit of the loop. At this moment the fabric is about to be drawn back somewhat and be wound up, so that the bar will carry it towards the rear under tension. The loop is now completed, and is pushed against the fabric which drops along the reed blades 33; the reed and the supporting parts 13 then returning to the rear and taking up the position of Fig. 8. At this moment the rollers 10 are in contact with the least projecting part of the cams 9, i. e., in contact with the points a (Fig. 1) of said cams.

Figure 8:
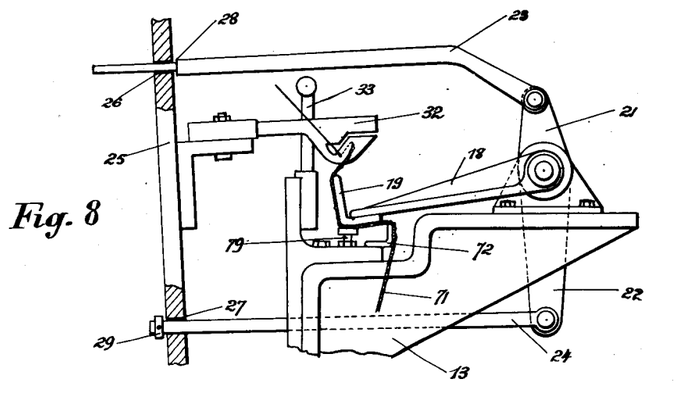

By continuing to turn the shaft 5 the position shown in Fig. 8 is attained. In that figure, it will be seen that the two links 23 and 24 are free and that the tension bar 19 rests upon the adjustment screw 79, as in Fig. 5. It can also be seen that the support 13 and all its parts are in the rear position, and that the bar 19 is bringing back the warp yarn, after having stretched it rearwardly, until it takes up the position shown in Fig. 4.

Since a loop has now been entirely finished and put in place, the loom is ready to commence a second loop, and so on.

The fabrics can be produced in all lengths and widths, as pieces and shaped articles of the most varied patterns and designs without jacquard or like reproducing means. These fabrics can be substituted with advantage for those hitherto employed for hosiery, since they will stretch sufficiently for use in such articles and will not run; they also have the advantage of furnishing a great variety of patterns or designs.

As will already be evident from the description set forth above of the loom, the fabric is obtained by twisting a warp thread around a more or less stretched weft thread, or by twisting these two threads together.

The warp 35 is inserted into the yarn guide 32 so that it will preferably assume an approximately triangular shape, with the weft in the middle (Fig. 1). This warp may be threaded into the guide as a single thread, either to the left or to the right of the latter, which—as will be seen hereafter—enables the weft to be twisted to the left or right. A double warp thread may also be threaded in the said guide, i. e., one to the left and the other to the right; and in this case the weft thread will be twisted to the left and right at the same time. In this manner, a great variety of designs or patterns can be obtained in the fabric, and this variety can be still further increased by varying the thickness, color and spacing of the warp threads— suppressing from time to time one, two or more yarn guides—and of the weft threads and so forth.

Figures 9, 10, 11, 12, 15, 16:
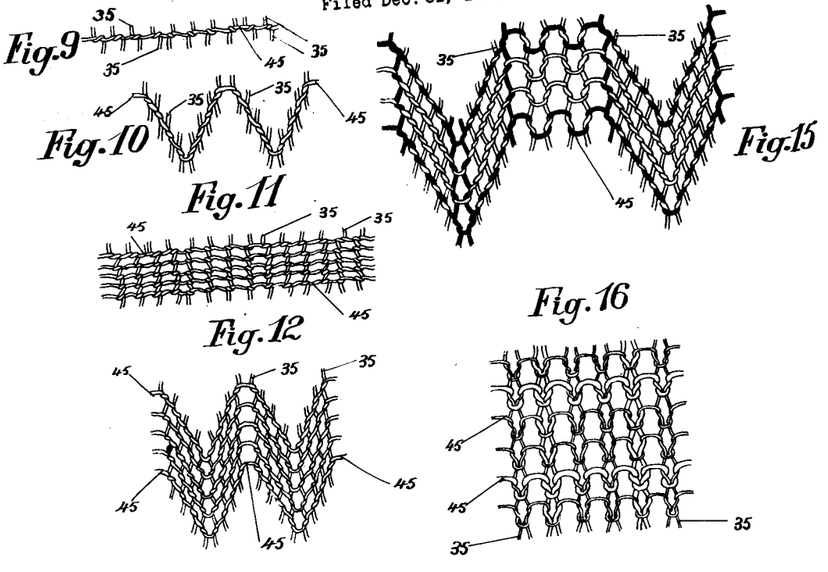
Figs. 9 to 22 show the various patterns or motifs of the fabric produced.

Fig. 9 shows a row of loops in a fabric before being released, and Fig. 10 the same row after being released and the warp stretched.

In these two figures it will be noted that the warp ends 35 are twisted in groups, sometimes to the right and at other times to the left, so that the weft 45 will incline to the left and right and will thus form the patterns or designs. According to the pattern desired, the warp ends can also be twisted to the right or left either as single threads or in regular or irregular groups.

Fig. 11 shows a fabric made of rows of loops of the kind shown in Fig. 9 before being released and without being stretched, and Fig. 12 shows the same fabric when finished. It can be clearly seen in Fig. 12 that the direction of the weft is changed at each point where the twisting of two adjacent warp threads is effected to the right and the left. It will also be seen that the weft threads 45 which were in a straight position relatively to the warp during the weaving have now a form differing from that which they had in the first place. This change is due to the twisting of the weft yarn with its warp yarn, such deformation taking place towards the left or right. In this figure it will also be seen that in order to allow the weft to take up its final position, the warp has had to be displaced, descending or rising obliquely with reference to its first position, according to circumstances.

Figure 13:
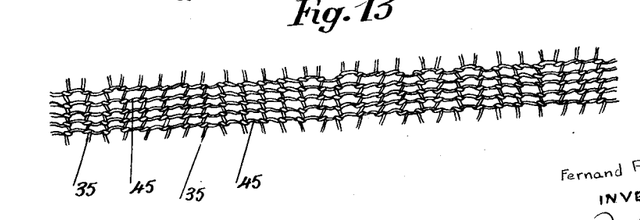
Figure 14:
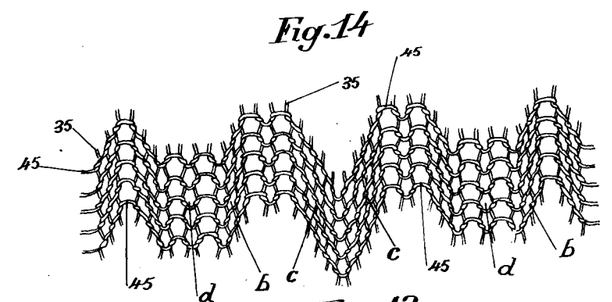

Figs. 13 and 14 show another pattern of fabric. Fig. 13 shows it prior too bring released, and Fig. 14 after release and stretching.

It can be observed in Fig. 14 that the fabric exhibits parts inclined to the left $b$, parts inclined to the right $c$, and also substantially straight parts $d$. To obtain these straight parts $d$, the sequence of the twists of the warp yarn 35 is interrupted at a given moment, i. e., if, for example, three twists have been made to the right, beginning with the part $c$ inclined to the right, the fourth twist will then be made to the left, the fifth to the right, the sixth to the left, and so on. It will be seen that, according to the number of alternations of the twistings, the straight parts $d$ can be obtained of any desired width.

Figs 15 and 16 show a fabric in which the warp ends 35 and the weft threads 45 are composed of threads of different colors and different counts. The intercalation of threads of different counts allows of obtaining designs or patterns in relief, and for certain classes of fabrics, their aspect will thus be much improved.

Figure 17:
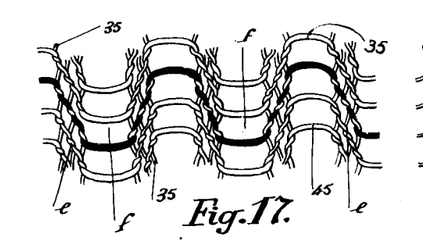
Figure 18:
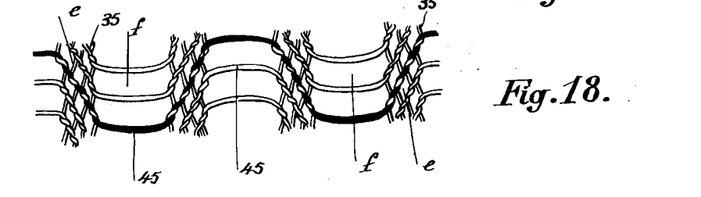
Figure 19:
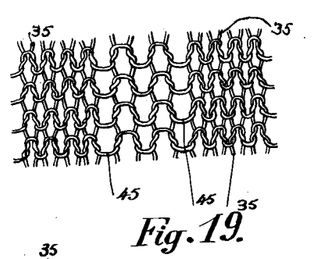
Figure 20:
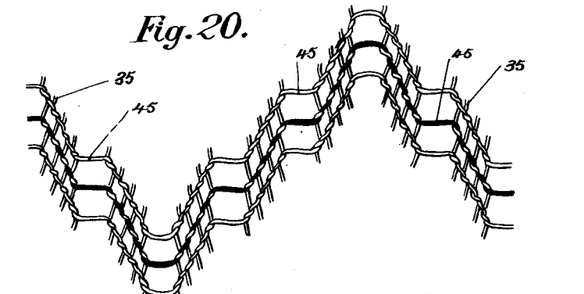
Figure 21:
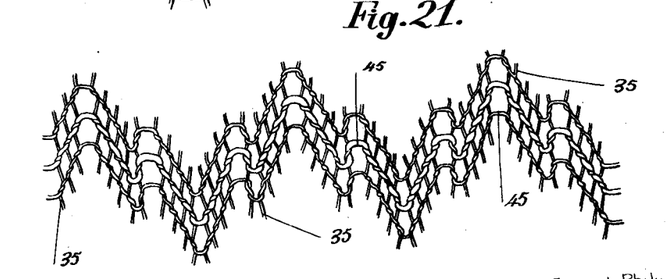
Figure 22:
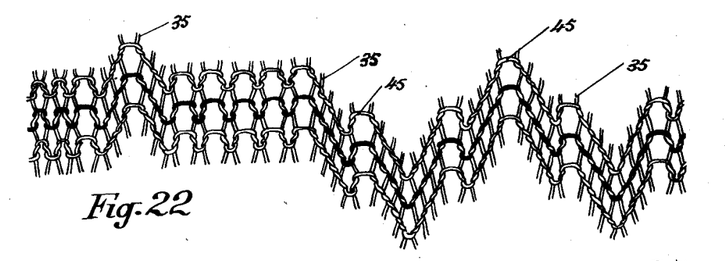

In Figs 17 and 18 it will be noted that the warp threads 35 are brought together in groups $e$ of the three and four threads, being separated by the spaces $f$ which may be of variable width and regular or irregular; said spaces $f$ may be readily obtained by omitting at these points to thread a suitable number—2, 3, 4 or more—of the yarn guides 32.

The fabrics represented in Figs. 19, 20, 21 and 22 are obtained in the same manner as those in the preceding figures and are only intended to show the great variety of patterns or designs to be obtained by wholly or partially combining the several methods of proceeding as shown in Figs. 9 to 18; and obviously, therefore, the arrangement and the number of the threads, the spacing, and the count and colour may be varied so as to obtain the maximum number of patterns or designs.

It should be noted that the definte patterns or designs are only obtained after the weaving, and either automatically by releasing the fabric from the loom, or by stretching it lengthwise if the yarn—and chiefly the weft—is not pliable enough to assume the proper shape in the natural manner, as will occur in some cases when the materials employed consists of artifical silk or wholly or partially of metal, or again in the case of patterns which more or less assume their definite position naturally, according to the material used.

The finishing treatment may change the general form of the fabrics by stretching them in a given direction or in all directions, and either in like or in unlike proportions. The said fabrics may be sized or not, in order to keep them in certain forms, or for any other reason. They may also be subjected to various other preparatory treatments, finishings or operations intended to change the appearance of the fabric, as in the case of known fabrics; but even without any special preparation the said goods will always possess a natural form such as has been set forth above.

I claim:—

1. In a loom, the combination with stationary yarn guides to hold the warp threads in the form of closed loops, of means to insert weft threads through the loops to bind the warp threads together, means to draw the loops off the yarn guides onto the enclosed weft threads, and an oscillatory tension member moving in a semi circular path about the guides to manipulate threads in said guides to form another series of warp loops.

2. In a loom, the combination with a main frame, of stationary yarn guides secured thereto to hold the warp threads in the form of closed loops, means to insert weft threads through the loops to bind the warp threads together, means to draw the loops off the yarn guides onto the enclosed weft threads, supports pivoted to said frame, a shaft rotatable in said supports, a tension bar movable in a semi-circular path about said yarn guides and secured to said shaft to form another series of warp loops, and means for raising and lowering said supports.

3. In a loom, the combination with a main frame, of stationary yarn guides secured thereto to hold the warp threads in the form of closed loops, means to insert weft threads through the loops to bind the warp threads together, supports pivoted to said frame, a shaft rotatable in said supports near one end thereof, reeds carried near the other end of said supports and movable between adjacent yarn guides to draw the loops off the latter onto the enclosed weft threads, a tension bar movable in a semi-circular path about the yarn guides and keyed to said shaft, and roller and cam means for moving said supports about their pivots.

4. In a loom, the combination with a main frame, of stationary yarn guides secured thereto to hold the warp threads in the form of closed loops, means to insert weft threads through the loops to bind the warp threads together, supports pivoted to said frame, a shaft rotatable on said supports, a tension bar movable in a semi-circle about the yarn guides and keyed to said shaft, levers having arms of unequal length keyed to said shaft, means cooperable with a part of the main frame for guiding the movements of said lever arms, reeds secured to the supports and movable between adjacent yarn guides to draw loops off the latter onto the enclosed weft threads, adjustable means on the supports for limiting the downward movement of the tension bar and means for moving the said supports about their pivots.

5. In a loom, the combination with stationary yarn guides to hold the warp threads in the form of closed loops, means to insert a weft thread through the loops to bind the warp threads together, means to draw the loops off the yarn guides onto the enclosed weft threads, and means operating in a semi-circular path about said yarn guides to manipulate the threads to form another series of warp loops.

In testimony whereof I affix my signature.

FERNAND PHILY.